United States Patent
Palermo

(10) Patent No.: US 8,239,454 B2
(45) Date of Patent: Aug. 7, 2012

(54) SYSTEM AND METHOD FOR TELEPHONE CONFERENCE BASED COMMUNICATION, ENTERTAINMENT AND ADVERTISING PLATFORM WITH ACCOUNTING FUNCTIONALITY

(76) Inventor: Joseph Palermo, Brooklyn, NY (US)

( * ) Notice: Subject to any disclaimer, the term of this patent is extended or adjusted under 35 U.S.C. 154(b) by 1163 days.

(21) Appl. No.: 12/029,420

(22) Filed: Feb. 11, 2008

(65) Prior Publication Data

US 2009/0113316 A1    Apr. 30, 2009

Related U.S. Application Data

(60) Provisional application No. 60/984,364, filed on Oct. 31, 2007.

(51) Int. Cl.
| G06F 15/16 | (2006.01) |
| G06F 3/048 | (2006.01) |
| G06F 3/00 | (2006.01) |
| G06Q 30/00 | (2012.01) |
| H04M 15/00 | (2006.01) |

(52) U.S. Cl. ........ 709/204; 715/706; 715/753; 715/758; 715/962; 715/971; 705/14.15; 379/114.03; 379/114.23; 379/114.14; 379/114.28

(58) Field of Classification Search .................. 709/204; 715/706, 753, 758, 962, 971; 379/114.03, 379/114.23, 114.14, 114.28
See application file for complete search history.

(56) References Cited

U.S. PATENT DOCUMENTS

| 6,061,716 | A | 5/2000 | Moncreiff | |
| 6,088,435 | A | 7/2000 | Barber et al. | |
| 6,336,133 | B1 * | 1/2002 | Morris et al. | ................. 709/204 |
| 6,772,436 | B1 | 8/2004 | Doganata et al. | |
| 6,839,417 | B2 | 1/2005 | Weisman et al. | |
| 6,931,114 | B1 | 8/2005 | Martin | |
| 7,603,683 | B2 * | 10/2009 | Reto | ............................... 725/34 |
| 2002/0144273 | A1 * | 10/2002 | Reto | ............................... 725/86 |
| 2005/0262542 | A1 | 11/2005 | DeWeese et al. | |
| 2007/0038758 | A1 * | 2/2007 | Mu et al. | ....................... 709/227 |
| 2007/0197247 | A1 | 8/2007 | Inselberg | |
| 2010/0205541 | A1 * | 8/2010 | Rapaport et al. | ............. 715/753 |
| 2011/0047487 | A1 * | 2/2011 | DeWeese et al. | ............. 715/758 |

* cited by examiner

Primary Examiner — Joseph Avellino
Assistant Examiner — Aftab Nasir Khan
(74) Attorney, Agent, or Firm — Leason Ellis LLP.

(57) ABSTRACT

This invention enables people from the at-home viewing or listening audience of any television or radio broadcast to talk with each other to discuss the program's content on the telephone at any time before, during or after a show. In addition to discussion forums based on broadcast and print media content, the system provides premium priced telephone access to people with specific expertise, e.g., sports stars, politicians and a host of other specialists. Income is earned on a per-minute or flat-rate basis and billed to the caller primarily via credit card or their phone bill. Revenue can be derived from the sale of advertisement, e.g., mentions of the sponsor over the telephone during the initial greeting and within conferences, as well as from the licensing of the service to media networks as a value added service.

12 Claims, 3 Drawing Sheets

System & Method for Topic Driven, Teleconference-Based Communication, Entertainment and Advertising Platform (TBEAP)

SYSTEM AND METHOD FOR TELEPHONE CONFERENCE BASED COMMUNICATION, ENTERTAINMENT AND ADVERTISING PLATFORM WITH ACCOUNTING FUNCTIONALITY

CROSS-REFERENCE TO RELATED APPLICATION

This application claims priority under 35 U.S.C. §119(e) to U.S. provisional application Ser. No. 60/984,364, filed Oct. 31, 2007.

FIELD OF THE INVENTION

The present invention relates to interactive applications involving a television broadcast display and viewers of the broadcast, and more particularly, to a system that enables television viewers of a specific program to join in an audio conference.

BACKGROUND ART

People who watch television, listen to the radio or read newspapers and magazines often have a desire to hear more about the subjects they are learning about and to share their own ideas on the subjects with others. A prior method for meeting this desire is disclosed in U.S. Pat. No. 6,839,417 of Weisman. The Weisman patent discloses a method and apparatus that allows individuals to initiate, join, manage, and participant in topic-based conference call programs. Such calls may be continuously on-going or awaiting participants (e.g. a channel based on a particular sports team). The conference calls may be pre-scheduled and promoted (e.g. a panel discussion, post-game discussion group, or a book club), or they may be ad hoc. In some cases, conference calls according to the Weisman patent would be available exclusively to subscribing participants. Participants in the system can report inappropriate behavior and offenders can be blocked from further access to the system.

U.S. Pat. No. 6,088,435 of Barber et al. is directed to establishing calls between parities who have a similar interest, but do not know the identity or telephone number of the other party. Similarly, U.S. Pat. No. 6,931,114 of Martin discloses a system and method for providing voice chat services over telephone networks. It can enable a plurality of telephone users to have voice communications among themselves without revealing their identities or telephone numbers. A caller in this system can access the chat service by dialing a telephone number that is associated with the system. When the caller (the subscriber) is connected to the system it routes the caller to a chat room in which he can participate as a chatter, contributing to a topic of common interest among all the chatters in that chat room. In entering the system the subscriber can be initially offered a "main menu," at which the subscriber is allowed to select from among a plurality of main topics, each of which is associated with a chat room or channel. The conference operations use live agents to monitor conferences, encourage discussions and answer questions.

In U.S. Pat. No. 6,772,436 of Doganata there is shown apparatus for enabling TV viewers to participate in audio conferences that are linked to the programs that they are watching, without the need to dial in to a conference call. The apparatus enables TV viewers to participate in audio conferences that are linked to the programs that they are watching by simply pushing a button on a remote control device resulting in an automatic dial out to an audio bridge. Depending on a remote control button being activated, the system enables switching of the user's telephone line among different conferences without having to dial a second conference call number.

Various news media, such as CNN.COM or NYTIMES.COM, often run online polls or questions related to the content of news articles on their websites. Further, in the 1980s, Byte Magazine ran online forums, recorded them and published summaries of them in their magazine.

SUMMARY OF THE INVENTION

This invention enables people from the at-home viewing or listening audience of any television or radio broadcast to talk with each other to discuss the program's content on the telephone at any time before, during or after a show. In addition to discussion forums based on broadcast and print media content, the system provides premium priced telephone access to people with specific expertise, e.g., celebrities, sports stars, politicians, actors, professional person such as an architect or engineer, a person whose presence on a conference created increased economic value and a host of other specialists. Income is earned on a per-minute or flat-rate basis and billed to the caller primarily via credit card or their phone bill. Revenue can be derived from the sale of advertisement, e.g., mentions of the sponsor over the telephone during the initial greeting and within conferences, as well as from the licensing of the service to media networks as a value added service.

In one illustrative embodiment of the invention, a TV show on a topic, e.g., one of the Sunday morning shows, can flash a message on the screen inviting those interested in discussing the topic to dial into a telephone conference. Conventional telephone conference bridge equipment and software is used to handle the call. In an Internet chat room, anyone of thousands of people logged into the site can be invited post a message and have it seen and commented on by thousands of others logged into the internet. In a telephone conference, this would not work because you cannot conference thousands of people and you would not be able to hear anyone person among the babble of those thousands of talkers. Thus, since a large and unpredictable number of callers may want to participate in the conference, the conference system software is configured to set up a series of parallel conferences with a limited number of callers in each so that each caller will get a chance to speak. The desire is to balance the callers in each conference so that those with different views will be in each conference. To accomplish this, when the conference number is dialed and the access code is entered, the caller will have to answer a brief list of questions through an automated system, e.g., through keypad commands or a voice activated commands. The questions are intended to determine on which side of the issue the caller will fall. Based on the answers, the person is assigned to a conference that is as balanced as possible between those of different views.

The system will charge each participant in the telephone conference and the operator of the system can share a part of the income with the TV show that issued the invitation. Preferably, all charges will be added to the caller's telephone bill, but other payment systems are possible.

Advertisements tailored to the topic can be played at the beginning of the conference or at other times in the conference, or they can be played individually to each caller as they log on to the system. This is another potential source of revenue. A database of callers and their topics of interest could also provide other advertising opportunities.

Expert telephone conference participants can also be provided. The expert can be in sports, politics, medicine, science, etc. Instead of an expert, a special participant could be a celebrity in sports or entertainment. For example, if the topic is foreign policy, a former Secretary of State can be on one of the conferences. When the caller dials in, one of the questions would be whether the caller would like to be in a conference moderated by the expert. Naturally, the cost of participating in that conference would be much more, and part of the profit would be shared with the expert.

If a person were to call in for a conference and there are too few participants or the topic is absent, the caller could leave contact information so that when sufficient interest was generated, the caller would be contacted with a time for when the conference would start and the call in information.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention.

BRIEF DESCRIPTION OF THE DRAWINGS

The foregoing and other features of the present invention will be more readily apparent from the following detailed description and drawings of an illustrative embodiment of the invention in which.

DETAILED DESCRIPTION

Figure 1:
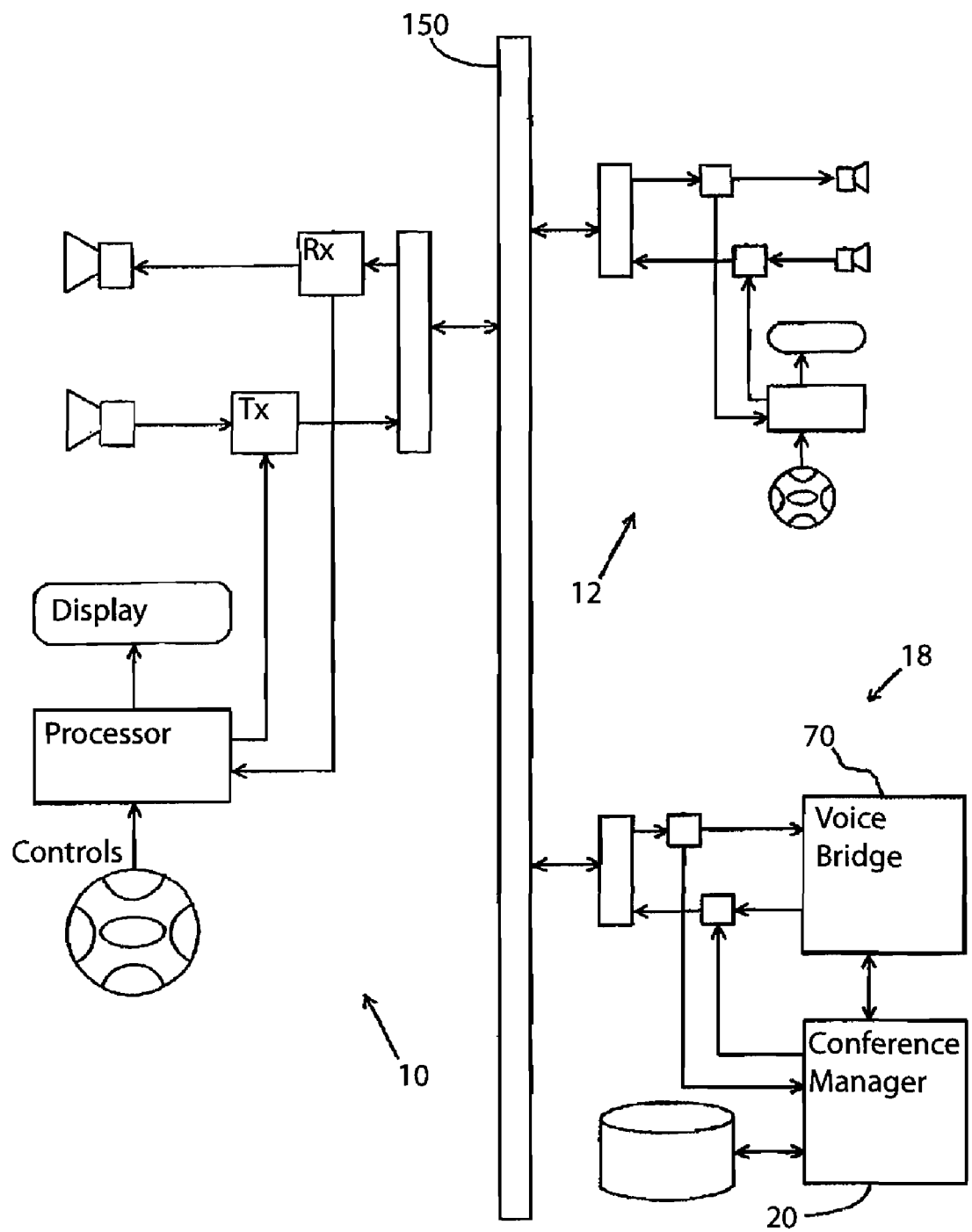
FIG. 1 is a block diagram of the system of the present invention and the environment in which it operates.

The present invention operates in a conventional telephone conference system as illustrated in FIG. 1. Callers at stations 10-12 connect to a communications channel 150, which may be a conventional telephone network or some other network, e.g., the internet. Each user has a device which allows them to send and receive voice messages, to view menus and to send data, e.g., selections from the menus. Conventional cell phones have this capability.

Connected to the communications channel 150 is a conference server 18 which controls the system of the present invention. It includes a voice bridge 70 for setting up a plurality of parallel conference calls, a conference manager 20 in the form of a processor for controlling operation of the system and a database of information for use in the system. An accounting and bill paying system is connected to the system for collecting revenue for the system.

Figure 2:
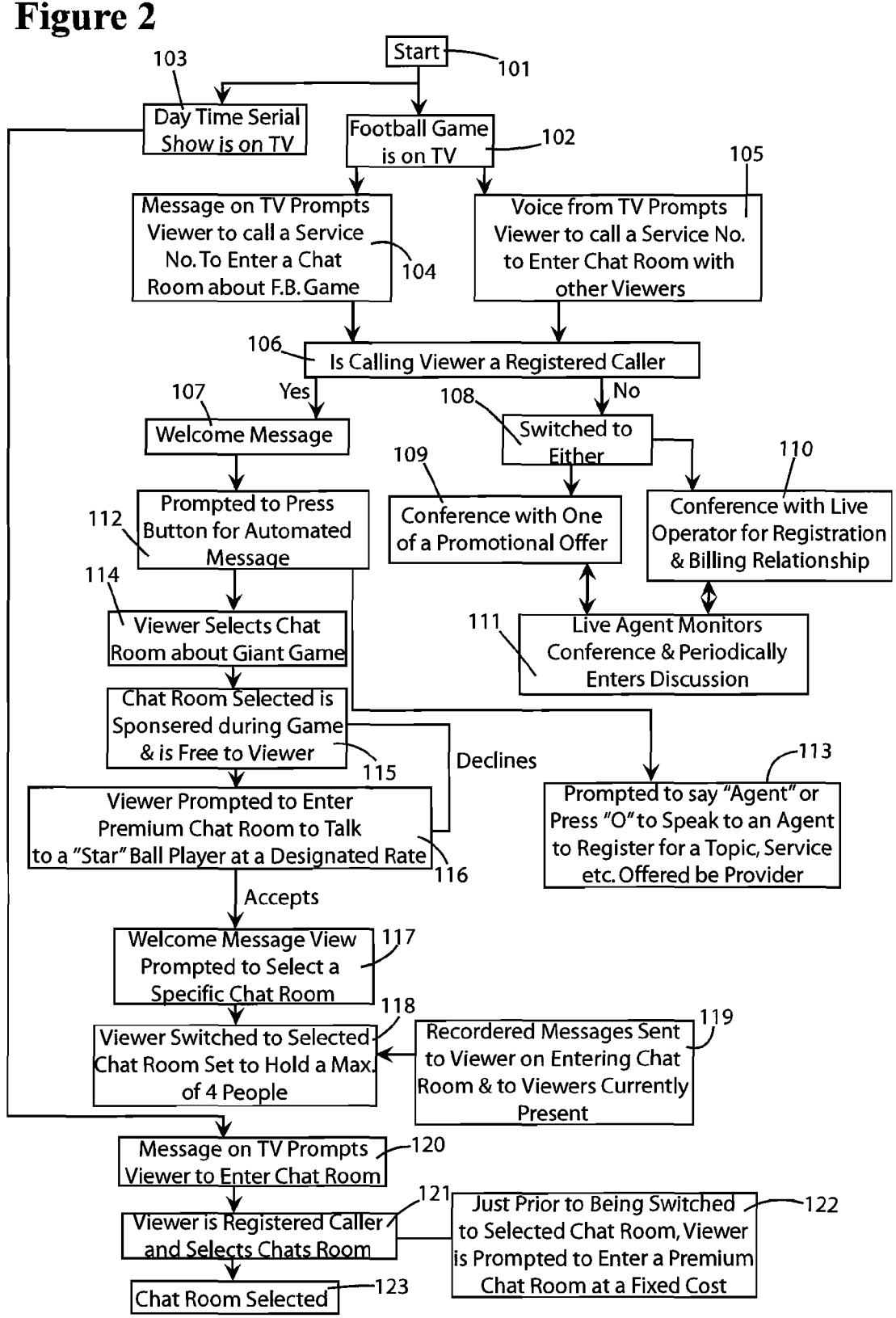
FIG. 2 is a flow chart which is intended to represent the steps to be implemented during an embodiment of the present invention.

Referring to FIG. 2, there is shown a flow chart of operational blocks and decision points which can be utilized during implementation of an exemplary embodiment of the present invention.

At start, step 101, a person is experiencing a media presentation, e.g. a radio or t.v. show, a presentation over the internet, or is reading a newspaper or magazine article. For example at step 101, a television set is turned on and John is watching the NY Giants vs. Pittsburgh Steelers football game on NBC. At the same time that the game is on, other members of the household are watching a day time serial show on another television set, step 103.

Referring to the program that John is watching, during the game a chiron flashes on the bottom right of the screen and prompts viewers to call in to the toll free number to discuss the game with other viewers, step 104. The game announcer also states "If our at-home viewers want to talk to other at-home viewers watching the game call "888-talk now" that's "888-825-5669" at step 105. Assuming John accepts the invitation and makes the call, the system checks to determine if John is a registered caller, step 106. If John had registered previously, and dials in, he is greeted by an automated message, step 107, which states: "Hi John, welcome to Talk Direct." Had he not been a registered caller, a caller recognized by the system, also known as a recipient, he would have either been switched, step 108, into a conference under one of the system promotional offers, step 109, or switched to a live operator for registration and to establish a billing relationship, step 110. Live Agents, step 111, also monitor all conferences and periodically enter to encourage discussions or answer system questions. By entering as a registered user, John agrees to pay, e.g., $0.15 per minute, for the call.

At steps 112 and 113, John hears the greeting message:

"To discuss a show you're watching or listening to, or a newspaper or magazine you're reading, state the name of the show or press 1 for the automated menu. At any time while you're in any place in the system, state "Agent" or press "0" to speak with one of our Agents to register to discuss any topic, learn of premium services, establish a billing relationship or get a special lesson on Navigating around the system."

John states, e.g., "Giants game", step 114. The system recognizes this (from a list of names programmed in the system that would describe the show, such as "NY/San Francisco", "NFL", "the game", etc.) and switches him into the NY Giants forum, step 115. John normally pays, e.g., $0.15 per minute; however, if the system has a licensing deal, for example with NBC and the NFL, the general conferences may be offered free to all callers during the game. The NFL and NBC then share the negotiated licensing fee of $0.10/minute paid to the system for the total minutes in NFL sponsored conferences during the game.

When a conference is selected, the system states, for example,

"Welcome to the NFL Talk Room, a free conference compliments of NBC and the NFL. The General conferences are free. Our premium conferences include speaking live with former NFL star running back Lynn Swan holding conference in our "Ford Truck Veteran's Corner" for $2/minute. To enter say "Swan" or press 5. To speak with hall-of-framer Joe Namath at a cost of $5/minute, state "Namath" or press 12. To enter the general conferences state "Conference" or press 1."

Prior to entering the premium priced forums the caller is warned with a notice, step 116, which may state: "Please note you are entering a premium priced forum at $5/minute. If you do not wish to enter this forum say exit now."

If the caller John states "Conference", step 117, he is switched into the general conference room section. The system recognizes his phone number and his conference identifier, such as "Big John72" and states for example:

"Welcome 'Big John 72', please choose your conference: "Giants fans only" press 1; "Steelers Fans only" press 2. If your a Steelers Fans and want to talk with a Giants fan press 3 and if you're a Giants fan and want to talk with a Steelers fan press 4. To enter into random NFL forums state "Random" or, to just listen in on other conferences without talking, say "browse". If you want to enter an open conference simply state "enter". Remember, if you already know the system, you never need to listen to this menu, just state the commands at any time."

Assuming John is a Giants fan and wants to talk with a Steelers fan, he hits 4 and the system switches him into an open conference room, step 118, that had been set to hold a maximum of four people. In the example it started with one Giants fan and one Steelers fan, had a second Steelers fan switched in, leaving one opening that was then filled with John as the final Giants fan. Had there not been an opposing fan waiting, the system would have retained John's choice and prompted him to browse until a Steelers fan had entered, at which point he would have been switched in. He also would have been given the choice to hang up and have the system call him back when a person who matched his choice became available. As each person was switched into the forum they each hear an introductory message, which may be a paid advertisement such as: "Welcome to NFL Discussions brought to you by Ford Trucks. Ford Trucks, Built Tough". Those already in the forum may hear the same message or a completely different paid advertisement whenever a new person is introduced into the call, e.g., "Gillette Mach 3 razors introduces Big John 72 into the forum", step 119. Thus, the system can provide flexibility in advertising.

In another exemplary scenario, at the same time the game is on, other registered members, for example Mary, Bill, and Theresa, are watching on another television, step 103, in the same household. They are watching another type of programming, e.g., an episode of the soap opera "Days of Our Lives" where the character Alan is caught cheating on his wife Monica with Monica's best friend Leslie. The viewers see the system advertisement, step 120, which provides them the opportunity to discuss the latest episode. The ad directs them to call in and state "Days of Our Lives" at the show prompt, step 121. If they accept the invitation and make the call, just prior to being switched into conference, step 123, they hear an introductory advertisement, step 122, e.g.:

"Proctor and Gamble welcomes you to the "Days of Our Lives" Conference Group. In our premium conference section you can speak live with actors Roger Jones (who plays Alan) and Sylvia Parsons (who plays Monica) after the show for $10/minute. Just state "Alan & Monica" or hit *87 now to be called back when Roger and Monica are available. Also, Tim Block, staff writer for "Soap Opera Digest" is available live for $2/minute". The number of members allowed to speak can be limited, but the number of members allowed to listen only can be unlimited.

This provides the callers the option to enter a premium service at an increased rate. As a further option, they can be invited to play their favorite character with actors and actresses, e.g., students from London's "Royal Academy of Dramatic Art" who are available remotely in London to play the parts of the soap characters with people. The actors or the dramatic company may be compensated with e.g., a 50% share of a $2/minute fee charged the callers.

Figure 3:
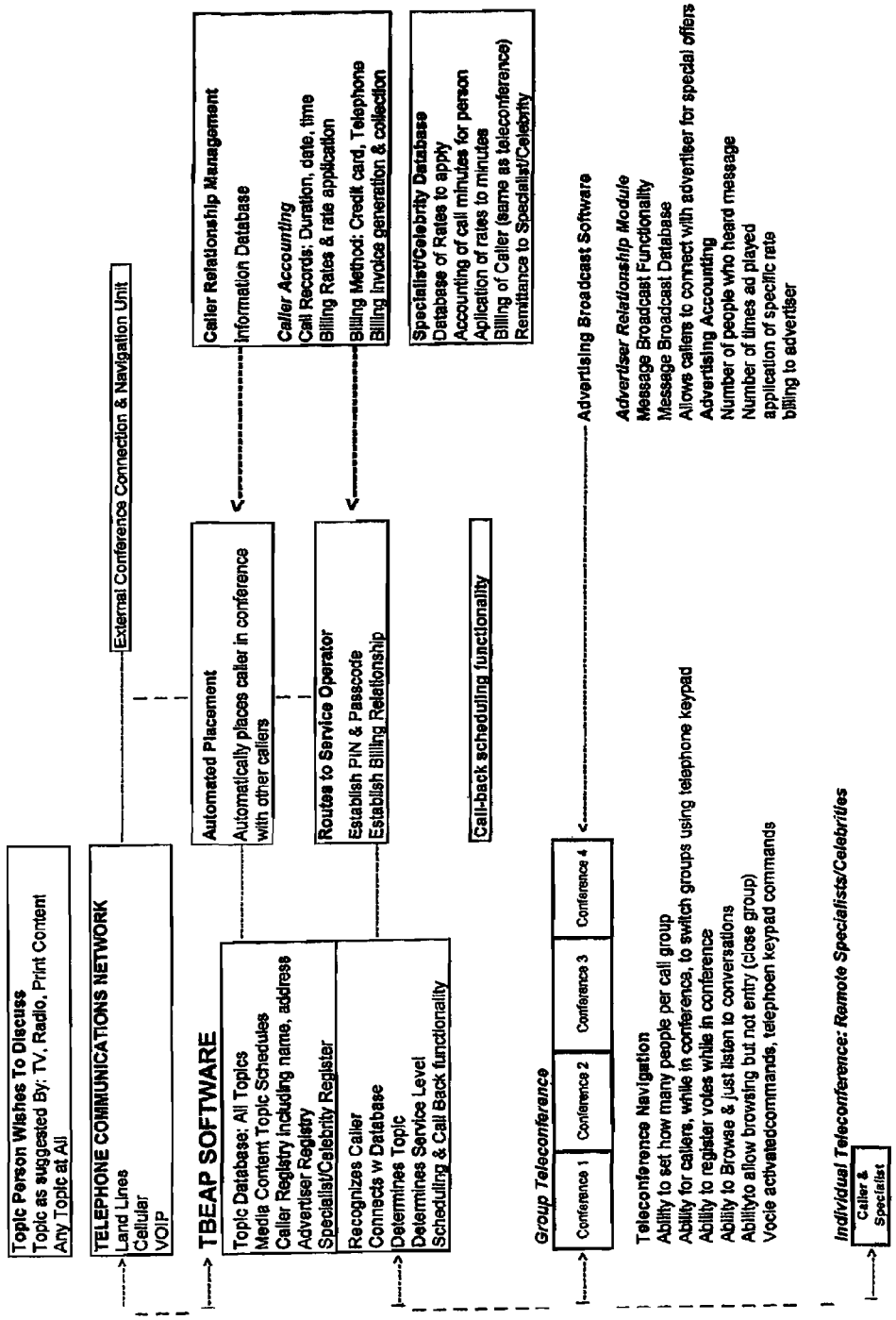
FIG. 3 is a block diagram of the system capabilities of topic driven teleconference-based communication, entertainment and advertising platform.

Referring to FIG. 3, there is shown a block diagram of the system and method for the topic driven, teleconference-based communication, entertainment and advertising platform (TBEAP).

In a further exemplary scenario, a person is view a program on the History Channel about ancient Rome, step 103, and decides to respond to an advertisement 120, which provides the opportunity to discuss the program with a professor of Roman history at Yale University, i.e. an expert as opposed to a celebrity. The ad directs then to call in a state "Rome" at the show prompt, step 121. If they accept the invitation and make the call, they may enter the conversation as a listener at a particular rate. However, if they want to enter the conversation as a participant, so they can ask questions and state positions, they would be prompted to select the service at a higher rate per minute.

The expert can receive a fixed fee set by the system operator or a percentage of the proceeds, so that the fee is not fixed. Also, the system can operate an auction so that entry of a limited number of active participants will depend on how much they are willing to bid for the privilege.

Other embodiments of the invention are disclosed below in narrative form. These generally follow the segments of the flow chart of FIG. 2.

External Navigation Unit

A user of the system can use a land-line phone, a portable phone, a satellite phone or a cellular phone to connect to the system for audio participation. In addition, the system may provide video in the form of menus or content that may be retrieved over a cell phone or personal digital assistant with a video screen. A number of such devices include cameras, so the system is capable of sharing at least still pictures of the conference participants to each other. Further, depending on the available bandwidth, video of the person speaking can be transmitted to the other participants in a conference.

Radio

While driving from work, Evelyn is listening to a National Public Radio broadcast on the Arctic Wildlife Preserve. She hears a prompt to call Talk Direct to discuss the show with other listeners and calls in on her cell phone. Evelyn is a Talk Direct Frequent Caller and pays a discounted general conference rate of $0.12/minute. When she's transferred into the NPR conference section she hears that scientists affiliated with the Sierra Club are available to discuss the issue of global warming for $2/minute and that 75% of the proceeds will be donated on her behalf to The Sierra Club Global Defense Fund.

Print Media

Susan is reading the NY Post and sees a particularly disturbing headline about the war in Iraq. She sees the Talk Direct logo at the bottom of the page stating "Call Talk Direct to discuss this story with other readers". Susan calls in and, when prompted, states "NY Post" and is placed in conference with other NY Post readers. The system notifies her that, for $2/minute, Iraqi citizens living in Baghdad are available to discuss the situation directly. The Iraqis there have a participation with Talk Direct for 75% of the proceeds of the call.

Group Deals

An outside salesperson for Talk Direct had met with directors of Fairhaven Corporation, a company that owns a group of 30 nursing homes nation wide. The salesperson has closed a deal with the company whereby the occupants of Fairhaven facilities have access to Talk Directs "Elder Companions" at a discounted rate of $5 per ½ hour call. Talk Direct pays remotely located people $6/hour to talk in conference with those at the homes. The Talk Direct contractors are located in remote rural regions with high unemployment rates and are happy to get at home work at $6/hour. Fairhaven subsidizes the calls paying Talk Direct $5 per ½ hour call in addition to the $5 paid by the occupant.

The same salesperson has closed a deal with Tokyo University to have English discussion forums hosted by Talk Direct contracted English teachers (fluent in Japanese) for their students who are enrolled in exchange programs with American universities and preparing to live in the United States.

System Accounting

The system accounting function proceeds to tabulate a multitude of data. It records the caller's ANI and records the time they're connected, in what forum and on what topic. It then references their pre-established billing setups and proceeds to send the totals and amounts to be billed on their credit card, phone bill or emails a prepayment notice and code. Once paid, the system then debits the amounts and keeps ongoing caller accounts accordingly.

Had there been a "free talk time" promotion the system would have recorded the callers ANI and kept track of the minutes they were in conference as part of this promotion. Once the talk minutes attached to his phone number reached the pre-set number of minutes allocated for the promotion, the caller would have been prompted that the free minutes were up and then would be switched to an agent to be registered. A caller can change his/her status by going from a listener to an active participant where the change of status can be at a set rate or by bidding. In addition, the initial callers can be given access free of charge and, thereafter, subsequent callers can be charged a fee which can be either fixed or escalates.

The system records the number of times the "Ford Trucks Built Tough" & "Proctor & Gamble" messages were played and how many people heard the message. It also records how many times the "Gillette Mach 3 Razor" introduction was played and for how many people. It also has a data base of information about which program includes the advertising material and the time and date of the program. In the case of Ford and Gillette, four people heard the messages one time each for a total of four audio impressions per advertiser. It had been agreed to, and subsequently entered into the system software, that Ford would pay $0.01 per impression and for Gillette the negotiated rate was $0.008 per impression as this was bundled as part of another deal for traditional ads. The system cumulates impressions and applies the rate specific to each advertiser. It then prepares and sends (by email and paper) an invoice at the end of the month to the respective client's advertising agencies for payment. Once payment was received the system would record it, adjust the balances and prepare statements accordingly.

Lynn Swann's premium forum had 10 people in it, 5 spoke with Lynn for 10 minutes, 3 remained in the forum for 5 minutes and 2 just listened in and left after 1 minute each. That totaled 67 minutes at $2 per minute charged to the callers for being in the Swan conference. His agreed upon participation was $1/3^{rd}$ of the gross revenue of $134 or $44.68 for being in the conference 10 minutes. Mr. Namath had chosen a smaller, more intimate forum and limited the conference size to a 4 person maximum. Over the course of the game he had a total of 30 different people in conference with 10 speaking to him for twenty minutes, 10 for twelve minutes, 5 for five minutes and 5 that stayed in for the one minute minimum just to say hello and say what great fans they were of his. This totaled 350 minutes for Mr. Namath at $5 per minute charged to the callers by Talk Direct. His agreed upon participation was 50% of the gross revenue of $1,750 or $875 for Mr. Namath over the course of the game.

The system tabulates the total minutes per caller and bills them according to their arrangement (credit card, phone bill, prepay) with a monthly statement prepared as to usage. The system also prepares a remittance statement to Mr. Swan and Mr. Namath with the details of usage and participation and wires the money into their (or their agent's) designated accounts then sends the statement and remittance advise by email and regular mail.

The system, at predetermined thresholds of fees incurred and call minute accumulated, will notify callers of these amounts while they are in conference without other persons in the forum hearing this information. For example, Theresa in the "Days of Our Lives" Forum had been in conference for ½ hour when the system notified her that she's used 30 minutes and incurred $4.50 in conference charges. It will also let members hear what they've spent on a monthly basis if they state "My Account" as well as being able to go to an Agent to get this information directly.

Call Backs, Advertiser Opportunities And Purchases

Sarah is watching the Oprah Winfrey show and sees an ad for Talk Direct that states "To discuss this show with other viewers calls 800-Talk-Now or 888-825-5669". She calls in and hears the prompt asking which show and states "Oprah". The system does not recognizer her phone number and prompts her to enter her ID and password and then states that if she's not a member she can join the conference for free for 10 minutes then be switched to an agent to register thereafter. She is not a member and chooses to try the system for 10 minutes. Sarah discusses the subject of Oprah's show, fad diets, with two others for the 10 free minutes then, after the system has determined the 10 free minutes are used up, politely notifies her and the others in the conference and switches her to an Agent to be registered. With the Talk Direct Agent, Sarah establishes herself as Sarah 1555 and sets up to be billed on her telephone bill. The Agent, after discussing her interests, records in the system that she is willing to be contacted between the hours of 6 pm and 8 pm on Mondays and Tuesdays to discuss Days of Our Lives, hiking, cooking or the band "Radio Head" by people who request these topics.

The next Monday night at 7 pm, a caller to the system requests to discuss Radio Head's new CD. The system dials Sarah and one other Talk Direct member who listed Radio Head on Monday nights. Sarah's phone rings and she hears the message "This is Talk Direct with "Mark Guitar" and "Alice 66" on the line to discuss "Radio Head". If you want to enter the conference hit *3. Sarah is in the mood for a little conversation, hits *3 to accept the call and is placed in conference with Mark and Alice. At the introduction to the conference the system prompts each entrant "Welcome to the Radio Head conference brought to you by Sony Music. To purchase the Radio Head CD while in conference hit #66 and it will be sent to your address and billed to your account".

Mark hears an announcement that there is a hot prospect for sale, a new CD at a special price. Mark decides to purchase the CD and hits #66. The system records the order then sends fulfillment information to Sony for mailing. It also sends an invoice for the agreed upon commission of 10% of the purchase price and a $1 fulfillment charge to Sony for the sale. In another embodiment, the member is given the option of talking directly to the sponsor of a service, a medical doctor, a drug supplier, etc.

On this evening there happens to be a general Celebrity conference group sponsored by gossip tabloid "The National Inquirer". In this forum, callers are given a promotion from Paramount Pictures that states "Two tickets to see Mission Impossible III for the first 50 people in conference" who hit *88". When people hit *88 they hear an ad for the movie and find out after the brief ad whether or not they won the tickets. Talk Direct charges Paramount Pictures $0.05 per caller for this special ad plus $2 per ticket winner to fulfill the ticket give-away premiums. It should be noted that a celebrity is different from an expert, within the meaning of this invention. A celebrity is merely sure as when is well know. However, an expert is someone who has special training, education of expenses has been an expert on a subject.

ESPN's "X Games" includes a "Sponsored By Mountain Dew" message when callers are placed into conference. They also hear "To get a coupon for 15% off a case of the New Mountain Dew, hit #88 or say 'Dew'". Talk Direct charges Mountain Dew $0.01 per impression for this ad and $0.15 to fulfill the coupon offer. Mountain Dew also wants to get opinions and do a focus group on their new soda. So, in addition to a special conference room set up to discuss the soda mediated by their professional focus group personnel, they also have a message that says "If you've tried the new Dew, tell us what you think! hit *55 and let us know". Talk Direct gathers, tabulates and transcribes the data and charges Pepsi a fee.

Conference Navigation

Alphonse, a registered Republican, is at the airport watching "Meet The Press" on his cell phone. The show is having a special debate with the two candidates for the upcoming California governor's election. He sees the Talk Direct chiron in the lower right of the screen and calls in. He's a registered member of Talk Direct and makes the choice of Republican speaking with a Democrat in order to debate the issues with other callers. He begins discussion with two other callers (one Republican and one Democrat) but finds their conversation too aggressive and somewhat offensive so he hits #1 on his telephone keypad and is switched into the next forum. In this forum, he discusses the issues with Jane, a knowledgeable, pleasant Democrat, for 5 minutes. After a conference is initially populated to the preset room size (e.g. 3 or 4 people) the system could either let random people in and out of rooms or else it could be set so that, once the initial people are in, no more can enter unless those in conference allow others in by hitting, say, *33 to signal to the system that the room is open. In our current example, at a certain point both Alphonse and Jane agree to open the conference and let another member into the conversation. One (or both) hit *33 to let the next random caller into their conference. At this point Fred is switched in but Jane has to take another phone call and leaves the conference. In addition, the admittance of additional members can be by bidding where the number of members allowed to enter is limited to members who are the highest bidders. In another embodiment, the fee for entering is proportioned where a set amount of the entering fee is given to charity or a specific cause such as a medical research program, the Salvation Army, the Red Cross, to help the victims of a disaster, etc.

The system politely notifies all in the conference when a person enters or leaves the conversation with an advertiser-supported message. For example, when Fred entered the discussion, Jane and Alphonse heard "Pfizer introduces "Fred-for-you" into the discussion". When Jane left she simply said goodbye to the others and hung up. Fred and the other caller heard "Pfizer thanks Jane 33". Fred and Alphonse continue to discuss the issues and after a few minutes they each decide to browse other forums and leave the conference.

Browsing Conferences and Broadcast Content Piped In

Conferences default to the status of "Open to Browsers" which let as many people as possible surf the current discussions and listen in to the conversation without participating. This allows, for example, a particularly interesting group of three people discussing the labor movement in the 60's to be heard by 20 browsers who randomly stumble upon the group's discussion. Callers are able to set their conferences to "Private" once all agree and hit *6 on their keypad to prevent outsiders from browsing.

While browsing or in conference the system can allow the ongoing broadcast content to stream into the conferences or, browsers can hear the show while they listen in on the different conversations.

Alphonse now decides to see what premium priced offerings are available, states "Premium" to the system, is prompted for what show and states "Meet the Press". The system states that there are PHD professors of history and political science from Stanford University available for $1/minute to discuss historical elections and the election process in the state of California.

Voting

The system prompts all persons leaving "Meet the Press" conferences to vote for the candidate of their choice. Talk Direct then tallies the votes and sends the data in real time to "Meet the Press" who is showing the tally on the bottom of the screen as the debate progresses. At the end of the show the Talk Direct Poll tally is displayed.

Recording Conversations

Callers in conference can elect to have their conversations recorded by all those involved by pressing, say, *44. The participants hear "Talk Direct is now recording" and as well as a notice that Talk Direct owns the content. Talk Direct then records the conference and will email it to all the members after the conference is over for a transaction fee of $1 per 15 minutes of recorded conference. Talk Direct periodically edits, produces and releases "best of" collections for download on iTunes or for release to be broadcast on the radio or TV.

Topic-Based Videoconferencing

The system also offer topic based video conferences with all the same attributes of the telephone service, but with people on camera at their PC's. This is a whole other direction for the service. It too can have people browse, switch conferences, be called back, be recorded, edited and produced as a show and all other attributes described to this particular software and method.

Inappropriate Actions

Sally, Eric and Greg are in conference about the rock band U2 when Eric who disagrees with Sally and Greg on a detail of a recent tour, starts to insult them with profanities. Both Sally and Greg hit *11. The system records that that particular conference has an inappropriate caller in it and records all the participants and an Agent is summoned into the conference to mediate. The system then tabulates that of the 10 conferences that day that hit the *11 notice, 8 of them happened to have Eric in them. A system Agent specializing in caller relations is notified and takes appropriate action by communicating this information to Eric and telling Eric that he must tone it down or else be blocked from the system. The system (by ANI phone number recognition) will be able to block Eric should he continue to be identified in problem conferences.

Auditing

The system is set-up so that is can be continuously audited by outside third party firms for accuracy in minute tabulations, advertiser impressions and billing follow through, and other information necessary to establish and insure ongoing credibility with callers, advertisers and merchants.

News programs and political commentary provoke deep sentiments compelling discussion. Sports fans from opposing teams would be able to discuss the game and their respective teams. Tabloid shows would suddenly have the potential to allow thousands of viewers to express their opinions to each other. Soap opera viewers could discuss their show's developments from that day's episode and for a premium, and talk to the actors and actresses after the show. News, politics, sports, tabloid, soaps, health, environment, religion, travel; the list of topics is limitless. However, currently, viewers and listeners do not have any method of immediately contacting their fellow at-home audience members to talk by phone. This immense potential source of revenue as a natural adjunct to broadcast and print media remains totally untapped domestically and globally.

Telephone Conferences for Mass Media Content

Talk Direct will enable people from the at-home viewing or listening audience of any television or radio broadcast to talk with each other to discuss the program's content on the telephone at any time before, during or after a show. In addition to discussion forums based on broadcast and print media content, Talk Direct will provide premium priced telephone access to people with specific expertise, celebrities, sports stars, politicians and a host of other specialists. Income will be earned on a per-minute or flat rate basis and billed to the caller primarily via credit card or on their phone bill. Revenue would also be derived from the sale of sponsor mention over the telephone during the initial greeting, within conferences and from the licensing of the service to media networks as a value added service. News programs and political commentary provoke deep sentiments compelling discussion. Sports fans from opposing teams would be able to discuss the game and their respective teams. Tabloid shows would suddenly have the potential to allow thousands of viewers to express their opinions to each other. Soap opera viewers could discuss their show's developments from that day's episode and for a premium, talk to the actors and actresses after the show. News, politics, sports, tabloid, soaps, health, environment, religion, travel; the list of topics is limitless however, currently, viewers and listeners do not have any method of immediately contacting their fellow at-home audience members to talk by phone. This immense potential source of revenue as a natural adjunct to broadcast and print media remains totally untapped domestically and globally. Forums on topics of general interest independent of broadcast programming will be available as would the ability to talk about any topic at any time, not just those inspired by media content. If no one is available to talk with a caller on a particular topic immediately, Talk Direct will contact them at a later time matching them with another interested person or professional. The system would also establish specific, general interest forums on popular subjects. For example, the Parents Forum, sponsored perhaps by Parent's Magazine, will take place nightly between 7 and 10 pm, the Investing Forum, sponsored by Charles Schwab, between 6 and 9 pm and the Classic Cars Forum, sponsored by Ford.

System Operations

Referring to FIG. 2, the system TBEAP software and corresponding business method is comprised of telephony software and conference bridge hardware that facilitates a unique method of establishing telephone conferences of various sizes to be formed with other random callers based on event inspired topics, such as those suggested by TV, radio and print media content, and various other criteria including subject, age and specific predetermined preferences (for example, political, religious and sports affiliations, personality type, etc.). The system also maintains a database of people and companies with a particular, pre-established expertise (or celebrity) who would be available for remote consultation with callers who can be routed to them either immediately or have a conference scheduled for a later time based on a specific request made. The system will maintain a database of member callers by recording names, phone numbers, topics of interest and billing account information as well as an infinite variety of criteria specific to each caller that defines his/hers teleconference preferences. The system coordinates call volume (from a central number) placing callers into telephone conference groups of various sizes (from one-on-one discussions to many people in conference together) using this infinitely expandable database of events, preferred topics and other criteria to determine which conference group to place a caller. The number of callers in each telephone discussion group can be set in advance with call flow routed by the system consecutively, as in a random roll-over method, or based on specific request. The system maintains the database of media content for the purpose of establishing conferences but also to establish discussion conferences on any topic using caller requests and other pre-established criteria and can coordinate advance times to contact people and establish conferences regarding specific subjects suggested by them. This allows for remote connection to an infinite number of people available remotely based on an infinitely expandable database of appropriate topics and other specific requests and other defining criteria such as what times they are available to talk and what they wish to discuss.

The system can pre-schedule audio announcements or advertisements and broadcast them into conferences at set intervals. The system will calculate how many times an ad played, apply billing rates and calculate and send invoices to advertisers. The system also allows callers to respond to advertisements and to connect with advertisers directly. For example when a group is initially formed it will say "Company X welcomes you, for a free sample of product x, state "product x" when you leave your conference." There will be this ability to send messages into the conference when someone enters. For example, "Company X introduces John to the group".

The system is integrated with full accounting functionality for both callers and advertisers allowing it to calculate and bill fees based on pre-established per-minute and flat-rate structures that would integrate with existing billing software to facilitate invoicing on credit cards and, for example, telephone statements. Accounting for advertisers includes counting the number of messages broadcast and the number of people who heard those messages as well applying specific rates and invoicing the advertiser. Also included is the ability to track and deliver on special offers.

The system can apply numerous and various billing rates to callers/members base upon preset criteria such as whether the caller is a registered user, has a prepaid account, uses the system frequently as measured by the number of minutes on the phone, and membership billing arrangement (credit card, phone bill advance payment by check). The system will maintain a database of different billing rates to be applied to different call groups, track number of minutes used, where the people are at, apply specific pre-set billing rates to remotely accessible persons with specific expertise or celebrity and tracks the number of minutes used and number of calls made. The system bills the caller, can calculate compensation to these remote persons of expertise or celebrity based on pre-established pay rates and also remit funds to those persons.

Callers in conference can navigate into and out of conferences at will using telephone keypad and voice recognition to issue commands as well as using an integrated "teleconference navigation unit." It allows callers to hit phone tone commands so others in conference don't hear the tones and can navigate from conference to conference silently. There is also access at all times to a live operator who can fully direct persons into any conference and manipulate all data on the system.

People in a conference have the ability to "close" or "open" a conference to other callers. That is, it allows callers to expand or contract the size of the conference group while in conference as well as to have the telephone dial out to invite people not currently in conference into the group either for a fee or by bidding. It also allows callers to browse from conference to conference listening only and not talking.

The system can memorize what callers are in a particular conference at any given time, and then call out and re-assemble conferences by calling remotely.

The system allows callers to register their names and assigns an alias or anonymous ID to that caller and allows for PIN and membership access based on the caller's status. The system determines the caller's status as new caller and/or returning caller.

The system can calculate and generate reports on a myriad of caller statistics such as topics referenced, call times, call length, total conferences and other pertinent data.

It retains data to automatically allow people to invite others into discussion groups or one-on-one discussion based on topics or other criteria (such as time available) previously determined.

Further, the system can be operated by callers through telephone keypad commands as well as automated voice-recognized commands. It allows other callers in conference to hit a telephone keypad or the external device "tone control interface (TCI)" to manipulate in and out of conferences.

The system can allow callers to interface with a live operator who can fully direct all conference and membership activity. Operators also monitor conferences, place people in conference by topic, set group size and maintain all user databases.

Broadcast media content can be heard in conferences with, for example, television and radio broadcasts piped into the telephone conference as they are happening. Further, if a caller hits a telephone key command, the system will register others in a conference as acting in an inappropriate way. The system statistically calculates who is consistently part of a "censure action: or who consistently overuses this censure action, and block them from using the system.

Voter can be cast by hitting the phone keypad.

For example, the system allows persons in conference the choice of allowing or not allowing the conference to be recorded based on a vote and then submit the recording to a central area for later broadcast and retrieval.

Keywords

An integral part of navigation are special keywords:
"Change Conference"
"Move Conference"
"Switch Conference" then topic
"mute navigate"
"meet at"
"go to conference"
"jump to"
"go to" conference
"close" confernece
"open" conference
"Personality" or "Talker Type": High Energy, Mellow, Angry, Sad, Happy This words allow operation of the system by voice command.

Devices

A part of the system is the integration of an external telephone "Navigation Controller" (not shown) that could be attached to the telephone and used to control conference room and service navigation. The device has conferencing switching commands, the command to register an inappropriate caller, minute check, a "memorize participants" command and other service specific commands;

A part of the system is a special headset (wireless) (not shown) that allows direct dial in to service and integrates with Navigation Controller above while allowing, for example, hands free discussion while watching TV.

There is no restriction on combining, separating, moving, matching, miss-matching or mixing the various features disclosed or which are contemplated from those disclosed.

While there has been described herein the principles of the invention, it is to be clearly understood to those skilled in the art that this description is made only by way of example and not as a limitation to the scope of the invention. Accordingly, it is intended, by the appended claim, to cover all modifications of the invention which fall within the true spirit and scope of the invention.

What is claimed is:

1. A method for providing a chat room service over at least one network, the method comprising the steps of:
    sending a message inviting a recipient to enter a chat room, wherein the message is sent via at least one of TV, radio, internet or print media;
    receiving a response to the invitation from a recipient;
    providing the recipient a menu of chat rooms of selectable issues;
    limiting the number of recipients that can be switched into a chat room for a selected issue as active recipients;
    setting up a second chat room for a selected event when the number of recipients in the chat room reaches a defined limit;
    identifying the point of view of a recipient about an issue prior to switching the recipient into a chat room of the event selected where the subject matter being discussed is at least debatable as to at least two distinctly different points of view;
    switching the recipient to a chat room on the selected issue which has not reached the defined limit, wherein the recipient is switched into a chat room on the selected issue based on his point of view so as to populate the chat room with number of recipients balanced between the two distinct points of view to the nearest extent; and
    charging a fee for participation in the chat room.

2. The method of claim 1 wherein the provider of the chat room service determines which recipient goes into the second room.

3. The method of claim 1 wherein said menu of selectable events comprises one of distance learning and cultural types of discussion, and making contact with another having a common interest.

4. The method of claim 1 wherein there is an auction so that entry of a limited number of active participants into the chat room will depend on how much they are willing to bid for the privilege.

5. The method of claim 1 wherein ongoing broadcast content is streamed into the conferences while the participants listen in on the chat room discussions related to the content.

6. The method of claim 1 further comprising the step of:
    sending an advertising message by a sponsor to the recipient about a product or service other than the chat room service, subsequent to the response to the invitation.

7. A system for providing a chat room service over at least one network, comprising:
    a process; memory;
    a conference manager processor causing a message chiron to be included in a content delivered to a recipient communications device inviting the recipient of the content to enter a chat room of selectable issues,
    said processor receiving a response to the invitation from the recipient communications device, said processor further sending to the recipient communications device, a menu of chat rooms of selectable issues and receiving from the recipient communications device a signal representing a menu selection of an issue, said processor requesting from said recipient device a set of responses indicating a point of view of the recipient about the selected issue that is debatable as to at least two distinctly different points of view; and a conference bridge which establishes one or more chat rooms, said conference manager processor causing the conference bridge to switch a recipient into a selected first chat rooms, but limiting the number of recipients that can be switched into the first chat room;

said conference manager processor causing the conference bridge to switch a recipient into a second chat room when the number of recipients in the first chat room reaches a defined limit, and causing the conference bridge to switch a recipient into a chat room based on his point of view so as to populate the chat room with recipients balanced to the nearest extent between the two distinct points of view and charging a fee participation in the chat room.

8. The method of claim 1 wherein the chat room provides audio and video communications between the participants.

9. The system of claim 7 wherein the conference manager processor, after the recipient has selected a chat room on a selected issue, indicates to the recipient communications device that is being switched into the chat room that requires a bid and indicates a current highest bid, receiving from the recipient communications device a bid and determining if it is the highest bid in a defined period of time, and switching the recipient into the chat room only where the recipient's bid is the highest in the defined period of time.

10. The system of claim 7 further including a broadcast facility having broadcast content, and
wherein the conference manager processor causes the invitation message chiron to be included in the broadcast content delivered to a recipient; and
wherein ongoing broadcast content is streamed into the chat room conferences while the participants engage in the chat room discussions related to that content.

11. The system of claim 7 further including an advertisement generator, wherein the conference manager processor causes an advertising message from the advertisement generator about a product or service of a sponsor, other than the chat room service, to be streamed into the chat room conference.

12. The system of claim 11 wherein the chat room provides audio and video communications between the participants.

* * * * *